Figure 1:
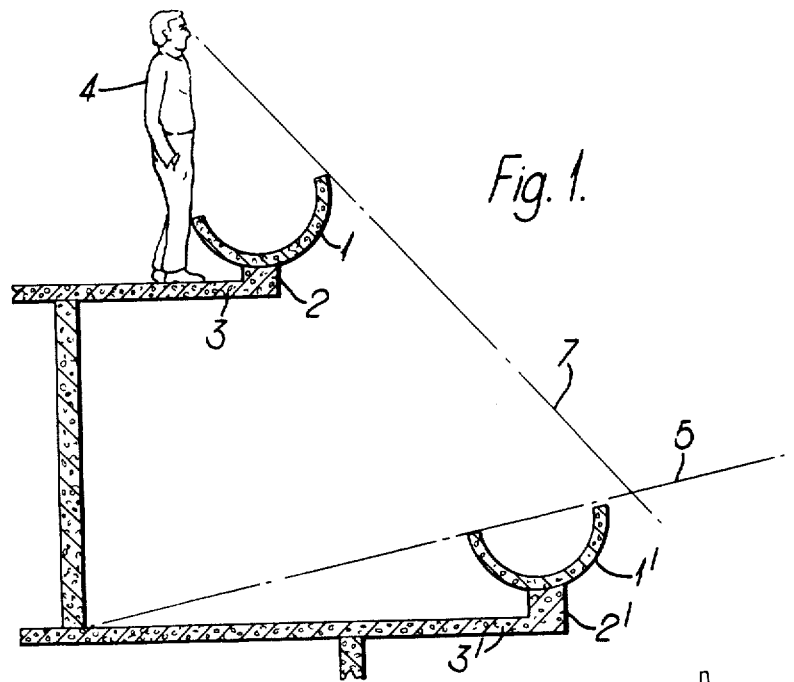

United States Patent

Nustad

[15] 3,675,368

[45] July 11, 1972

[54] RAILING FOR TERRACES OR BALCONIES

[72] Inventor: Per Eirik Nustad, Oslo, Norway

[73] Assignee: A/S Selvaagbygg, Oslo, Norway

[22] Filed: Feb. 16, 1971

[21] Appl. No.: 115,471

[30] Foreign Application Priority Data

Feb. 16, 1970 Norway ................................. 532/70

[52] U.S. Cl. .................................. 47/34, 52/73, 256/19, 47/36

[51] Int. Cl. ................................................ A01g 9/02

[58] Field of Search ..................... 47/34, 39–40, 33, 47/36; 119/61; 256/19, 21–22, 65; 52/73

[56] References Cited

UNITED STATES PATENTS

| 111,529 | 2/1871 | Goldsmith | 119/61 |
| 643,677 | 2/1900 | Payne | 47/33 X |
| 737,370 | 8/1903 | Drown | 119/61 X |
| 1,112,971 | 10/1914 | Bower | 119/61 |
| 1,293,785 | 2/1919 | Hurst | 47/36 |
| 2,113,523 | 4/1938 | White | 47/33 |
| 2,121,173 | 6/1938 | MacPherson | 47/33 |

FOREIGN PATENTS OR APPLICATIONS 190,327   6/1957   Austria

*Primary Examiner*—Robert E. Bagwill
*Attorney*—Larson, Taylor & Hinds

[57] ABSTRACT

This disclosure relates to a balcony or terrace railing which doubles as a planter. The railing is so designed that it achieves maximum strength with minimum bulk.

5 Claims, 3 Drawing Figures

RAILING FOR TERRACES OR BALCONIES

The present invention relates to a railing for terraces or balconies of residential buildings, which railing includes a channel-shaped body preferably serving as a case for pot-plants.

The only function of a railing is often to form a barrier so as to prevent any crossing of the railing line. In other cases the railing may also have the object of preventing people from looking at lower areas. In that case the railing must have considerable thickness in addition to the necessary height. For this purpose the railing is partly formed as a case for pot-plants. The previously known railings, however, are excessively expensive, they occupy a large portion of the floorage and tend to be disproportionally heavy, which involves further static and structural problems. Furthermore, the known types have led to problems in connection with freezing earth, involving complicated and expensive repairs.

The object of the invention is to eliminate all these disadvantages of the broad railing that can simultaneously serve as a case for pot-plants.

According to the invention this is achieved by a combination of the following features: that the channel-shaped body consists of a partial cylinder having an essentially circular, preferably semi-circular cross section, and is arranged on one or several bases, the largest cross dimension being approximately like or larger than the total height of the railing, and that the top edges of the semi-circular channel preferably are higher outside than inside the railing.

The base may consist of blocks or a comparatively narrow edge, which can be formed as a freely supported beam or an edge reinforcement of the terrace or the balcony floor, if the floor is not sufficiently rigid in itself.

By giving the channel shaped body a circular cross section, material is saved and the volume of the body itself is reduced as compared to the previously known bodies with right-angled cross sections. The volume reduction also results in need of less soil, which means a further reduction of weight. This is of importance when the channel shaped body is to be lifted up, as well as for the dimensioning of the supporting structure which is to absorb the weight of the channel shaped body.

Furthermore, the circular cross section forms a more rigid structure enabling the channel shaped body to be cast as a thinner shell than was necessary with the previously known solutions.

This results in further saving of weight and costs.

Also, due to the circular cross section it is possible in a simple manner to tilt the channel shaped body so as to let the outer edge of said body run at a higher level than the inner edge of said body. When railings of the type in question are mounted on residential buildings having large facades, it is important that the upper edges of the railings can be finally adjusted in line so as to give the facade a uniform appearance. This can be achieved in an especially simple manner by turning the channel shaped body in a suitable manner.

Additionally, the circular cross section creates a very good facade effect which also gives the facade a less compact appearance.

The present invention represents a technical solution that is nothing less than epochal as regards social house building. Large cases for pot-plants have until now only been economically realizable in very expensive buildings. The railing according to the invention can be realized at a price only slightly higher than that of a prefabricated balcony railing of concrete slabs of a type previously used.

The railing according to the invention serving as a case for pot-plants enables the user to create a very nice milieu on the terrace as well as between the single residential buildings, the facades of which will appear much more friendly because of the plants.

In connection with this solution the floorage occupied by the railing or the case for pot-plants is only one-third of the total thickness of the railing. The arrangement according to the invention also reduces the danger of damages of the case due to freezing. Any damages of leakages that may occur, are of no importance to the terrace floor, and since all outer portions of the case for pot-plants are visible it is easy to check that the case is in a satisfactory condition. The circular cross section also causes a suitable water flow on the bottom, which ensures good drainage.

In order to eliminate the danger of damages due to freezing, a resilient insulating layer can be arranged on the bottom of the case. Said insulating layer also serves as a drainage layer for the soil. At the same time the plants are prevented from freezing from below, and are thus not destroyed by the cold.

By giving the case for pot-plants a larger height at the outside of the railing than on its inside, a fine aesthetic effect is achieved, and sunbeams of a small angle are prevented from reaching down to the terrace floor to a lesser degree than when the case has equally high lateral edges. Also, the higher outside edge gives the plants in the case a certain protection against the wind, and the possibility of looking down at a lower terrace is reduced.

Due to the circular cross section the channel shaped body can be arranged partly outside the terrace floor without shadowing the apartment below.

Figure 2:
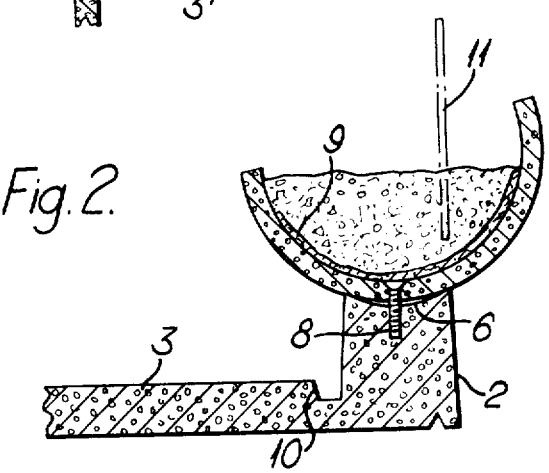
Figure 3:
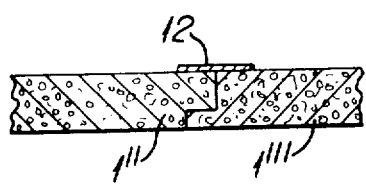

The invention can naturally be carried out in many ways by use of various materials, e.g. concrete or asbestos-cement, but an especially simple and practical solution is achieved in a manner described below with reference to the drawings, where FIG. 1 shows a cross section of two terraces of a residential building with railings according to the invention, FIG. 2 shows a more detailed section through a case for pot-plants according to the invention, and FIG. 3 shows a partial longitudinal section through the case for pot-plants according to the invention so as to illustrate a joint between two partial cylinder elements according to a preferred embodiment.

In FIG. 1 a partial cylindrical case 1 for pot-plants and of semi-circular cross section is arranged on a base 2, carried by a terrace floor 3 and, if desired, being self supporting or partly stiffening the terrace floor. 1',2', and 3' are corresponding units of a lower terrace. 4 is a person on the upper terrace. The sighting line 7 of the person 4 as regards the outer edge of the case for pot-plants shows that he cannot look down on the lower terrace. At the same time sun-beams 5 are allowed to fall on the terrace even though they have a small angle.

If the terrace floor 3 needs a reinforcement to support the case 1 for pot-plants, an upright edge or foot 2 of concrete can be cast when the terrace floor is cast. Said upright edge or foot 2 has the necessary height and the thickness and dimensions desired or necessary for reinforcing the floor and for forming a simple and stable support for the case for pot-plants. On top of said edge the case for pot-plants is placed. Said case can advantageously consist of elements in the form of halves of concrete or asbestos-cement pipes of a standard type. The upper portion of the upright edge is formed with a groove 6 so that the pipe 1 will rest in a cradle and can be turned into the desired tilted position and by the aid of a simple dowel or bolt 8 it can be secured to the base in a desired position. If sealed joints are desired, preferably on the outside of the railing, the joints can be covered by adhesive tape 12 (FIG. 3) in the case. Furthermore, a glass wool mat 9 can be provided as an insulating and drainage layer which is covered by soil.

FIG. 3 shows a section through adjacent portions of two halves of man hole rings 1'' and 1''' of concrete, where the joint inside is covered by adhesive tape 12.

The groove in the upper part of the upright edge can serve as a drainage for water penetrating through the case and channels can be provided from the groove to the outside or, if desired, to the inside of the upright edge.

What I claim is:

1. In the combination of a laterally extending terrace, balcony or the like and a railing therefor extending upwardly from the floor thereof, the improvement wherein said railing comprises:

a channel shaped body comprising a partial cylinder having an approximately semi-circular cross-section arranged on a base, said channel shaped body having an inside upper edge inward toward the terrace and an outer upper edge on the opposite side thereof, the diameter of the approximately semi-circular cross-section being at least as great as the total height of the railing above the said floor.

2. The invention of claim 1 in which said outer upper edge is at a higher level than said inner upper edge.

3. The invention of claim 1, said base extending upwardly from the said floor wherein the horizontal thickness of the base is approximately one-third the said diameter of the channel shaped body.

4. The invention of claim 3, said base including a groove in the top thereof on which the channel shaped body rests, said groove extending generally parallel to the channel shaped body.

5. The invention of claim 1, said combination including a plurality of said terraces, balconies or the like, arranged one above the other, and each extending outwardly from the building farther than the one immediately above it, each of said terraces, balconies or the like including a said railing, and said railings arranged so as to normally block the view of a person from one of said balconies, terraces or the like to the one immediately beneath it.

* * * * *